US012722186B1

(12) United States Patent
Song

(10) Patent No.: US 12,722,186 B1
(45) Date of Patent: Sep. 1, 2026

(54) ULTRASONIC CLEANING MACHINE

(71) Applicant: Aihua Song, Huizhou City (CN)

(72) Inventor: Aihua Song, Huizhou City (CN)

( * ) Notice: Subject to any disclaimer, the term of this patent is extended or adjusted under 35 U.S.C. 154(b) by 0 days.

(21) Appl. No.: 19/399,620

(22) Filed: Nov. 24, 2025

(30) Foreign Application Priority Data

Nov. 5, 2025 (CN) ......................... 202522351137.8

(51) Int. Cl.

| | |
|---|---|
| ***B08B 3/12*** | (2006.01) |
| ***B08B 7/00*** | (2006.01) |
| ***B08B 7/04*** | (2006.01) |
| ***G10K 11/162*** | (2006.01) |

(52) U.S. Cl.

CPC .............. *B08B 3/12* (2013.01); *B08B 7/0057* (2013.01); *B08B 7/04* (2013.01); *G10K 11/162* (2013.01); *B08B 2203/00* (2013.01)

(58) Field of Classification Search

None

See application file for complete search history.

(56) References Cited

U.S. PATENT DOCUMENTS

2010/0326484 A1* 12/2010 Wu ........................... A61L 2/24 134/140
2019/0176182 A1* 6/2019 Andersen .................. B08B 9/00
2019/0295521 A1* 9/2019 Hakuta ................ G10K 11/168
2020/0011567 A1* 1/2020 Herweck ................ F24F 8/108

* cited by examiner

*Primary Examiner* — Kaj K Olsen
*Assistant Examiner* — Pradhuman Parihar

(57) ABSTRACT

Provided here is an ultrasonic cleaning machine. The ultrasonic cleaning machine includes a main body and a cover body. An ultrasonic cleaning tank is arranged inside the main body. The cover body covers the main body, and an air barrier layer is arranged inside the cover body. The air barrier layer is configured for absorbing noise generated by the ultrasonic cleaning tank in an operating state. By arranging the air barrier layer in the cover body, and by using the blocking and absorbing effect of air on sound waves, outward propagation of noise generated during operation of the ultrasonic cleaning tank is effectively reduced.

17 Claims, 6 Drawing Sheets

ULTRASONIC CLEANING MACHINE

CROSS-REFERENCE TO RELATED APPLICATIONS

The application claims priority of Chinese patent application CN2025223511378, filed on 2025 Nov. 5, disclosure of which is incorporated herein by reference in its entirety.

TECHNICAL FIELD

The present disclosure relates to the technical field of ultrasonic cleaning, and in particular, to an ultrasonic cleaning machine.

BACKGROUND

An ultrasonic cleaning machine is equipment that uses cavitation effects generated by ultrasonic waves in a liquid to clean items. With the development of ultrasonic cleaning technology, ultrasonic cleaning machines have gradually moved from specialized industrial fields to the civilian market, and are widely used in daily household life for cleaning items such as dental braces, dentures, glasses, and jewelry. Existing household ultrasonic cleaning machines typically include a main body and a cover body arranged on the main body. An ultrasonic cleaning tank is arranged inside the main body for holding cleaning liquid and items to be cleaned. To control the operation of the ultrasonic cleaning machine, a control circuit board is usually required in the equipment to control the operation of an ultrasonic transducer and the operation of other functional modules.

However, existing ultrasonic cleaning machines in the prior art generate significant noise during operation. Vibration generated by the ultrasonic transducer during operation is transmitted through the cleaning tank to the main body, and then propagates outward through the cover body, forming noticeable noise pollution. Particularly when used in noise-sensitive environments, such as laboratories and medical institutions, the noise problem is especially prominent, affecting the working environment and user experience. Long-term work in a high-noise environment not only affects the physical and mental health of operators but may also interfere with the normal operation of surrounding precision instruments. Therefore, there is an urgent need for an ultrasonic cleaning machine that can effectively reduce operating noise to meet the needs of different usage environments.

SUMMARY

A primary objective of the present disclosure is to provide an ultrasonic cleaning machine, aiming to reduce operating noise of the ultrasonic cleaning machine.

To achieve the above objective, the ultrasonic cleaning machine provided by the present disclosure includes a main body and a cover body. An ultrasonic cleaning tank is arranged inside the main body. The cover body covers the main body, and an air barrier layer is arranged inside the cover body. The air barrier layer is configured for absorbing noise generated by the ultrasonic cleaning tank in an operating state.

In the technical solution of the present disclosure, by arranging the air barrier layer in a middle portion of the cover body, and by using the blocking and attenuating effect of air on sound waves, noise propagating outward during operation of the ultrasonic cleaning machine is effectively reduced, significantly improving the working environment. The arrangement of the air barrier layer does not require additional complex structures or expensive materials, the implementation is simple, the cost is low, and it is convenient for mass production and application promotion.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
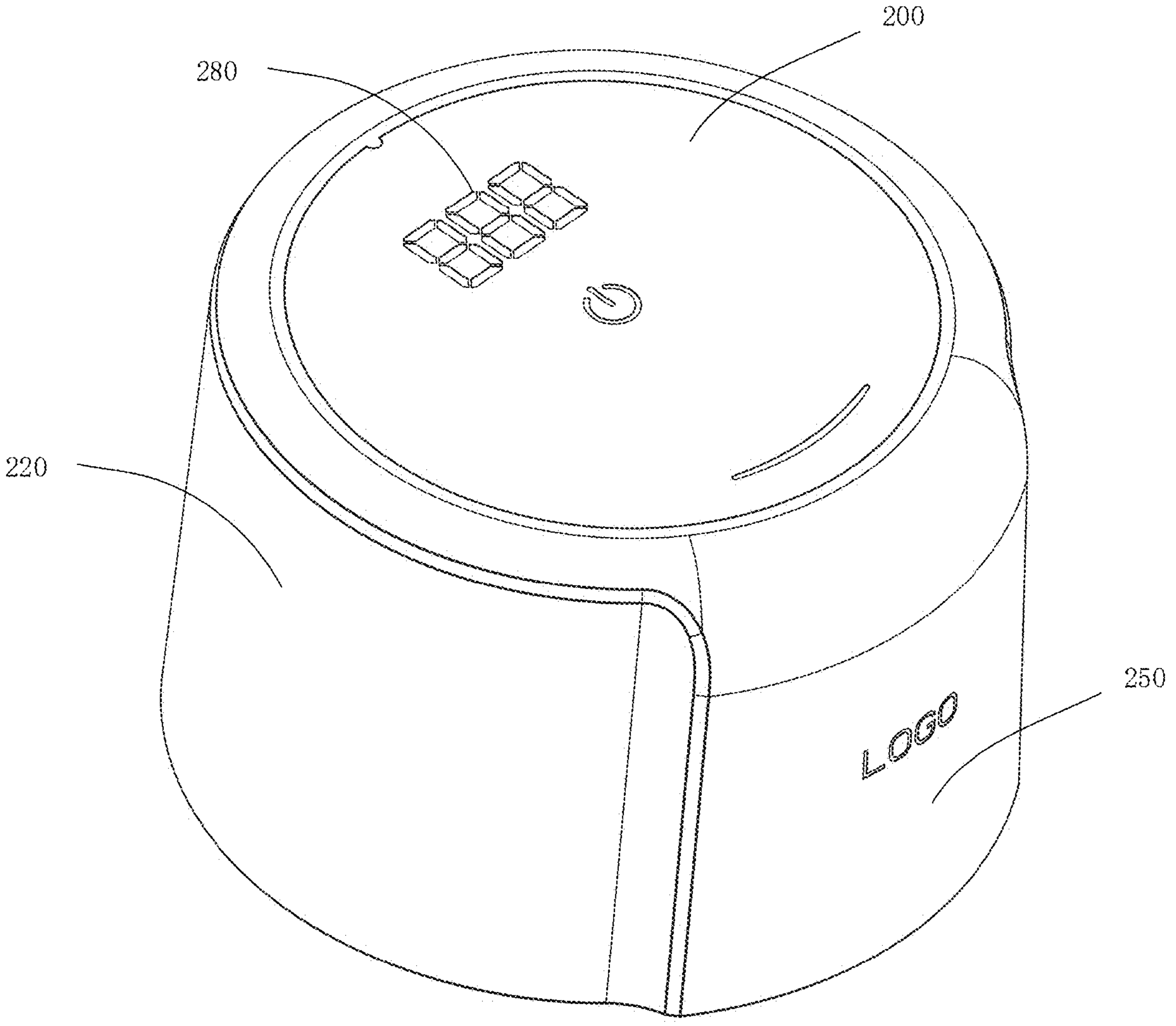
FIG. 1 is a schematic structural diagram of an embodiment of an ultrasonic cleaning machine provided by the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term “comprising” when utilized, means “including, but not necessarily limited to”; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to “an” or “one” embodiment in this disclosure are not necessarily to the same embodiment, and such references can mean “at least one”. In addition, the terms “first” and “second” are used for descriptive purposes only and cannot be understood as indicating or implying relative importance or implying the number of indicated technical features. Thus, the features defined as “first” and “second”

may explicitly or implicitly include one or more of the features. In the description of embodiments of the application, "a plurality of" means two or more, unless otherwise specifically defined.

Figure 2:
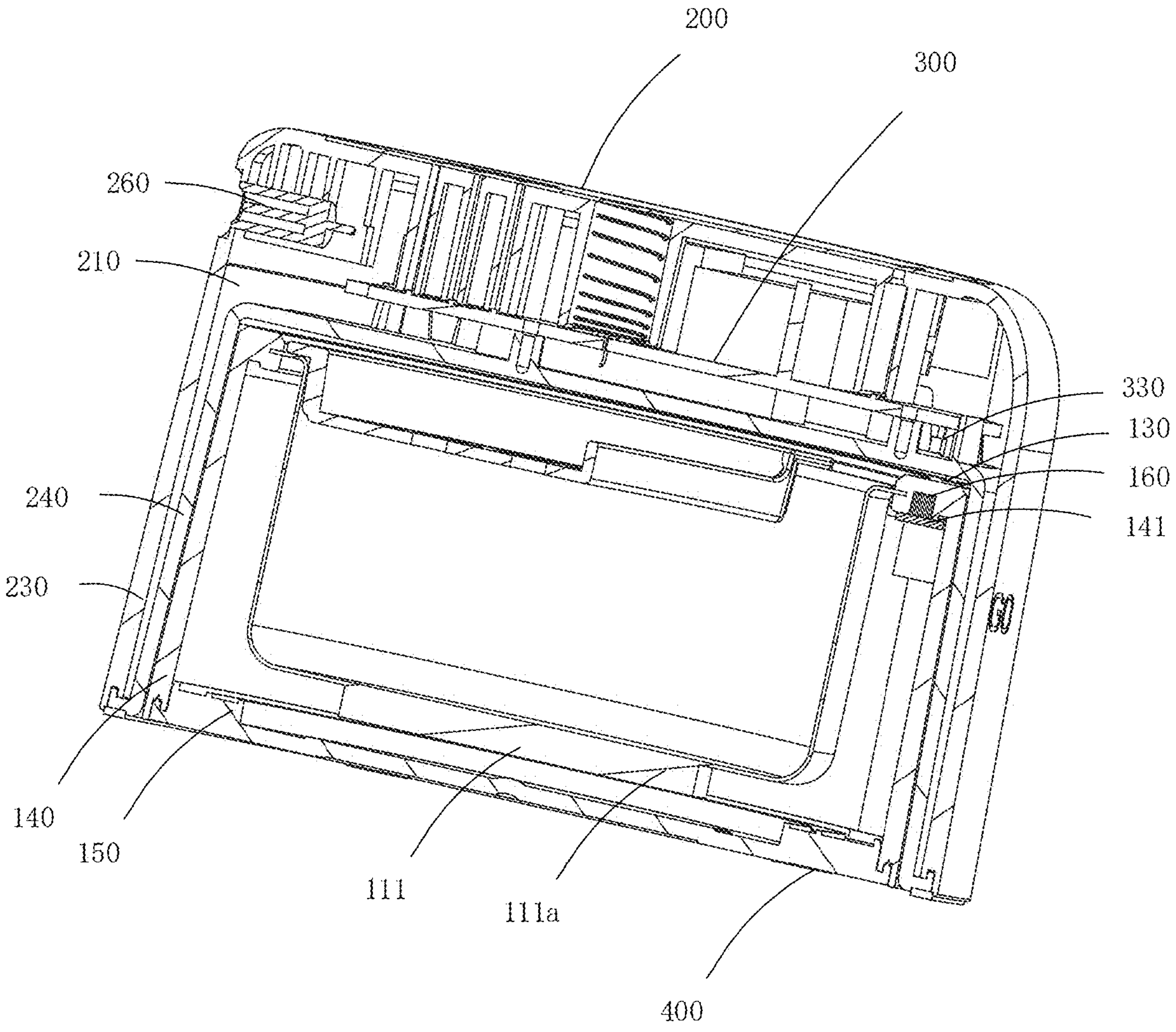
FIG. 2 is a cross-sectional view of an embodiment of the ultrasonic cleaning machine provided by the present disclosure.

The present disclosure provides an ultrasonic cleaning machine with good noise reduction effect. Referring to FIG. 1 and FIG. 2, in some embodiments, the ultrasonic cleaning machine includes a main body 100 and a cover body 200. An ultrasonic cleaning tank 110 is arranged inside the main body 100. The cover body 200 covers the main body 100. An air barrier layer 210 is arranged inside the cover body 200. The air barrier layer 210 is configured for absorbing noise generated by the ultrasonic cleaning tank 110 in an operating state.

In this embodiment of the present disclosure, by arranging the air barrier layer 210 in the cover body 200, the air barrier layer 210 absorbs noise generated by the ultrasonic cleaning tank 110 in the operating state. Using the blocking and absorbing effect of air on sound waves effectively reduces outward propagation of noise generated during operation of the ultrasonic cleaning tank 110. The air barrier layer 210 also functions as heat insulation, preventing heat from cleaning liquid from transferring to an outer surface of the cover body 200, thereby improving use safety.

Figure 3:
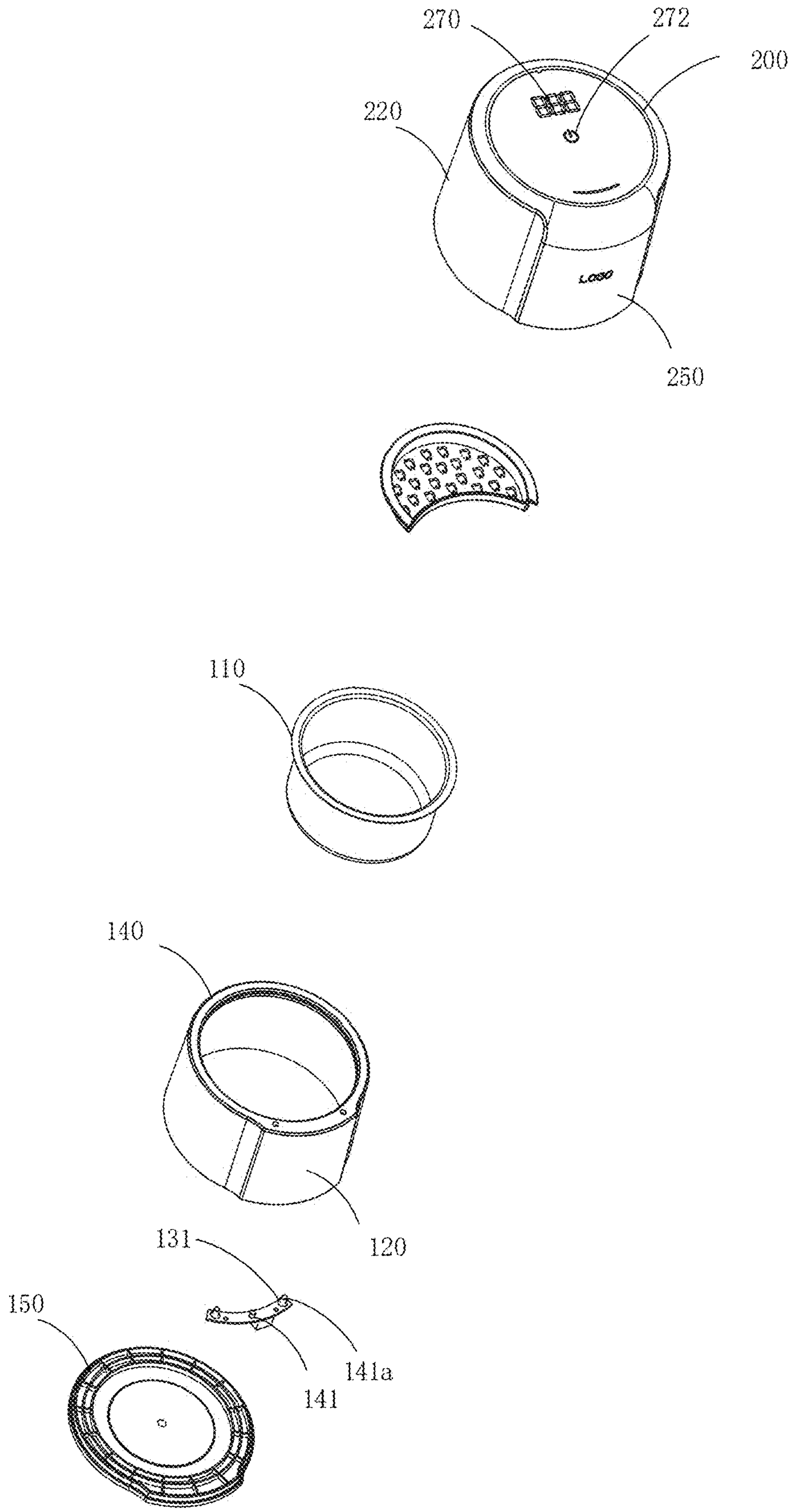
FIG. 3 is an exploded view of an embodiment of the ultrasonic cleaning machine provided by the present disclosure.

Referring to FIG. 2 and FIG. 3, in some embodiments, the cover body 200 forms a blocking wall 220 on one side of the cover body 200, the blocking wall 220 surrounds a side wall of the main body 100, and the blocking wall 220 is configured for blocking noise generated by the ultrasonic cleaning tank 110 in the operating state within the air barrier layer 210.

In this embodiment of the present disclosure, the blocking wall 220 serves as a physical barrier. When sound waves propagate to the blocking wall 220, the sound waves are absorbed and reflected by a material structure of the blocking wall 220, reducing a direct propagation path of the sound waves, and further reducing noise leakage. The blocking wall 220 is arranged surrounding the side wall of the main body 100, forming a surrounding noise reduction barrier. Compared to a blocking wall arranged on a single side, the surrounding noise reduction barrier blocks noise propagation in all directions, and the noise reduction effect is more comprehensive.

Referring to FIG. 2, in some embodiments, the cover body 200 includes an outer shell 230; and an inner shell 240 spaced apart from the outer shell 230, the outer shell 230 is connected to the inner shell 240, and the air barrier layer 210 is formed between the outer shell 230 and the inner shell 240.

In this embodiment of the present disclosure, the outer shell 230 and the inner shell 240 constitute a double-layer shell structure of the cover body 200, and the air barrier layer 210 is naturally formed between the outer shell 230 and the inner shell 240. This structural design is simple and reasonable, and easy to implement. The outer shell 230 serves as an outer surface of the cover body 200, acting as a protective barrier against the external environment, and the inner shell 240 serves as an inner surface, facing the ultrasonic cleaning tank 110.

The air barrier layer 210 between the outer shell 230 and the inner shell 240 functions for both noise reduction and heat insulation, preventing temperature of cleaning liquid from affecting a surface temperature of the outer shell 230, thereby improving use comfort. With this double-layer shell structure, unification of noise reduction, heat insulation, and structural stability is achieved, obtaining a technical effect of simple structure and complete functions.

Figure 4:
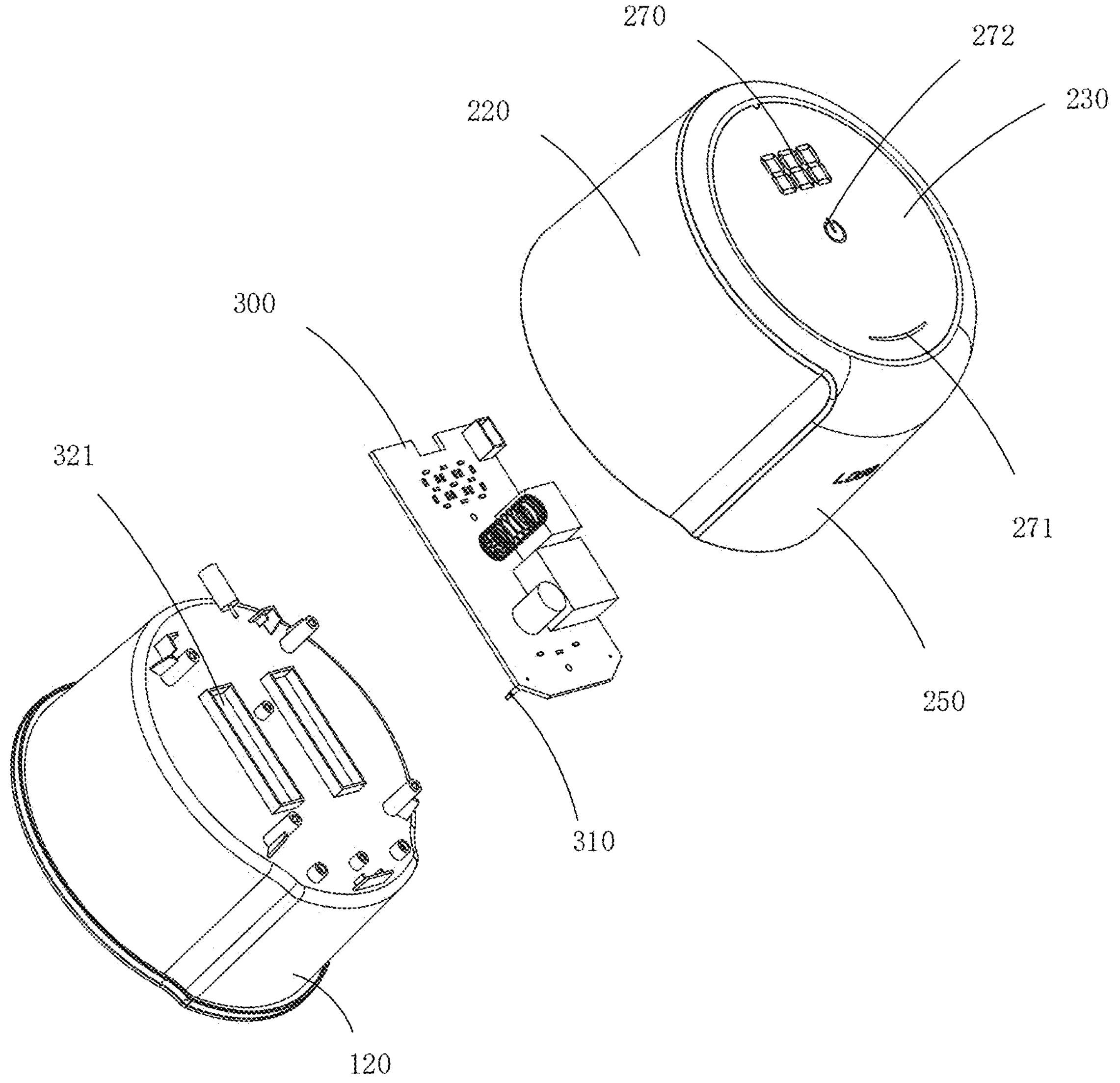
FIG. 4 is an exploded view of a cover body provided by the present disclosure from a certain perspective.
Figure 5:
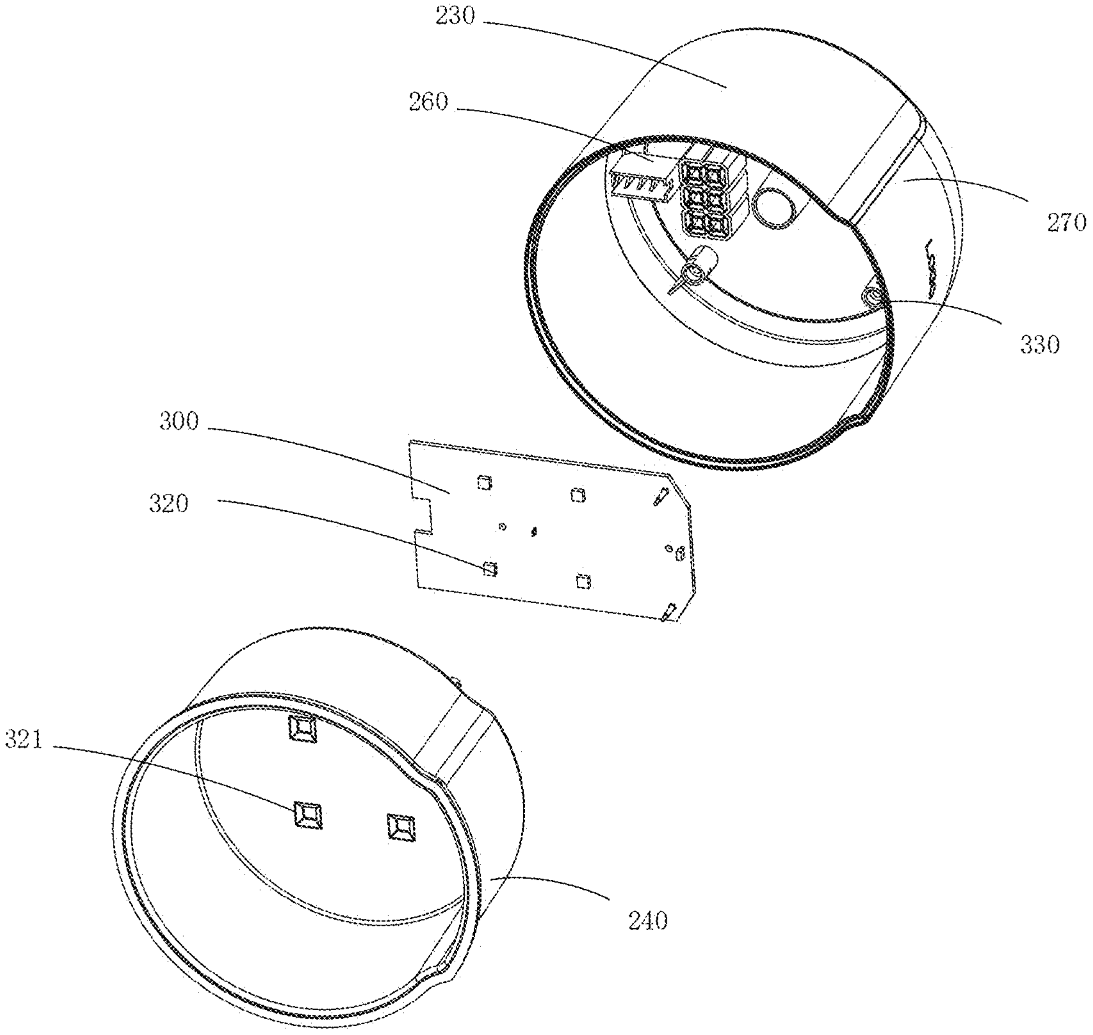
FIG. 5 is an exploded view of the cover body provided by the present disclosure from another perspective.

Referring to FIG. 4 and FIG. 5, in some embodiments, the outer shell 230 includes a first bottom wall 231, a first side wall 232 is provided on one side of the first bottom wall 231, the first bottom wall 231 and the first side wall 232 form a first receiving cavity 233; the inner shell 240 includes a second bottom wall 241, a second side wall 242 is provided on one side of the second bottom wall 241, a sealing structure is provided at an end of the second side wall 242, the second bottom wall 241 and the second side wall 242 form a second receiving cavity 243; the second bottom wall 241 and the second side wall 242 are both arranged in the first receiving cavity 233, and are respectively spaced apart from the first bottom wall 231 and the first side wall 232, and the sealing structure is connected to an end of the first side wall 232 to form a sealed air barrier layer 210.

In this embodiment of the present disclosure, the outer shell 230 forms the first receiving cavity 233 with an opening facing downward through the first bottom wall 231 and the first side wall 232, the first side wall 232 extends downward from a periphery of the first bottom wall 231, constituting a side wall portion of the outer shell 230. The inner shell 240 similarly forms the second receiving cavity 243 with an opening facing downward through the second bottom wall 241 and the second side wall 242, the second side wall 242 extends downward from a periphery of the second bottom wall 241.

When the outer shell 230 and the inner shell 240 are assembled together, the inner shell 240 is entirely embedded in the first receiving cavity 233, the second bottom wall 241 is arranged below the first bottom wall 231 and spaced apart from the first bottom wall 231, forming an upper air barrier layer, and the second side wall 242 is arranged inside the first side wall 232 and spaced apart from the first side wall 232, forming a peripheral air barrier layer. A sealing structure is provided at the end of the second side wall 242, and the sealing structure is connected to the end of the first side wall 232, sealing a space between the outer shell 230 and the inner shell 240 to form the sealed air barrier layer 210.

The air barrier layer 210 is distributed between both a top portion and a side portion of the cover body 200, surrounding a space above the ultrasonic cleaning tank 110 in all directions, achieving multi-angle blocking of noise.

Referring to FIG. 5, in some embodiments, the sealing structure includes a blocking edge 244 arranged at the end of the second side wall 242 and an engaging portion 245 arranged on the blocking edge 244, an engaging groove 234 is provided at the end of the first side wall 232, and the engaging portion 245 engages with the engaging groove 234.

In this embodiment of the present disclosure, the end of the second side wall 242 is bent outward to form the blocking edge 244, the blocking edge 244 has a ring-shaped structure, extending along a periphery of the second side wall 242. An outer surface of the blocking edge 244 is provided with a ring-shaped engaging portion 245.

A corresponding engaging groove 234 is provided on an inner side of the end of the first side wall 232, the engaging groove 234 matches a shape and a position of the engaging portion 245. When the inner shell 240 is embedded in the outer shell 230 and pressed downward, the engaging portion 245 aligns with and inserts into the engaging groove 234, and after elastic deformation, snaps into the engaging groove 234, forming a firm engaging connection, and tightly fixing the outer shell 230 and the inner shell 240 together.

This engaging connection method does not require screws or adhesive, assembly is simple and fast, disassembly is relatively easy, facilitating maintenance and cleaning. A tight fit between the engaging portion 245 and the engaging groove 234 forms a good sealing effect, preventing air in the air barrier layer 210 from leaking, and ensuring stability of noise reduction performance.

Referring to FIG. 2, in some embodiments, the ultrasonic cleaning machine includes a control board 300, the ultrasonic cleaning tank 110 is provided with an ultrasonic transducer 111, the control board 300 is electrically connected to the ultrasonic transducer 111; and the control board 300 is arranged in the air barrier layer 210.

In this embodiment of the present disclosure, the outer shell 230 and the inner shell 240 are assembled together by ultrasonic welding or snap-fitting, forming a relatively sealed hollow structure, effectively preventing external moisture and dust from entering the air barrier layer 210, and protecting long-term stability of noise reduction and heat insulation performance of the air barrier layer 210.

The control board 300 is arranged in this sealed air barrier layer 210, avoiding corrosion of a circuit board by moisture, and extending a service life of the control board 300. The air barrier layer 210 also provides a good heat dissipation environment for the control board 300, preventing the control board 300 from overheating due to operation heating.

Referring to FIG. 2, in some embodiments, a thickness of the air barrier layer 210 is in a range of 3 millimeters to 15 millimeters.

Referring to FIG. 1, in some embodiments, the cover body 200 is detachably connected to the main body 100, allowing the cover body 200 to be separated from the main body 100 for independently cleaning the main body 100.

In this embodiment of the present disclosure, the cover body 200 and the main body 100 are detachably connected via a detachable connection manner, for example, a snap-fit connection or a threaded connection. This detachable connection manner allows a user to conveniently remove the cover body 200 from the main body 100, thereby allowing the user to directly access an interior of the ultrasonic cleaning tank 110 for thorough cleaning and disinfection of the ultrasonic cleaning tank 110.

Referring to FIG. 1 and FIG. 4, in some embodiments, the main body 100 forms a protruding guide structure 120 on a side surface of the main body 100; the cover body 200 is provided with a corresponding guide groove 250, and the guide groove 250 is configured to engage with the protruding guide structure 120 to provide positioning and guidance during opening and closing of the cover body 200.

In this embodiment of the present disclosure, the guide structure 120 and the guide groove 250 form a cooperative relationship. When a user covers the cover body 200, the guide groove 250 guides the cover body 200 to move along a predetermined trajectory, ensuring the cover body 200 is accurately installed to a correct position of the main body 100, avoiding poor sealing or electrical connection failure due to position deviation.

A protruding design of the guide structure 120 increases structural strength, and a groove shape of the guide groove 250 provides a stable guide path. Cooperation of the guide structure 120 and the guide groove 250 makes the opening and closing process of the cover body 200 smooth and fluent, improving user operation experience. This guide design also has a certain fool-proof function, preventing the cover body 200 from being installed at a wrong angle or position.

Referring to FIG. 2 and FIG. 5, in some embodiments, the control board 300 is arranged in an upper portion of the air barrier layer 210, a power interface 260 is arranged on the cover body 200 and electrically connected to the control board 300, and the control board 300 is configured to control operation of the ultrasonic transducer 111 arranged at a bottom of the ultrasonic cleaning tank 110.

In this embodiment of the present disclosure, the control board 300 is arranged in the upper portion of the air barrier layer 210, facilitating electrical connection with the power interface 260 arranged on the cover body 200. After power is input through the power interface 260, the power is processed and distributed by the control board 300, and finally transmitted to the ultrasonic transducer 111, achieving control of an ultrasonic cleaning function.

The control board 300 integrates power management, signal processing, and control logic circuits, and can adjust a working frequency and power of the ultrasonic transducer 111 according to a cleaning mode selected by a user, thereby achieving cleaning effects of different intensities and durations. By arranging the control board 300 in the air barrier layer 210, effective control of the ultrasonic transducer 111 is achieved, and a protective effect of the air barrier layer 210 is utilized, solving a technical problem of control circuits being easily affected by environmental factors, and obtaining a technical effect of precise control and system stability.

Referring to FIG. 2 and FIG. 5, in some embodiments, the air barrier layer 210 includes a first barrier layer 211 formed between the first bottom wall 231 and the second bottom wall 241, and a second barrier layer 212 formed between the first side wall 232 and the second side wall 242; the first barrier layer 211 is arranged above the ultrasonic cleaning tank 110, the control board 300 is arranged inside the first barrier layer 211; the second barrier layer 212 is arranged surrounding the side wall of the main body 100; the power interface 260 is arranged on the cover body 200 and electrically connected to the control board 300; and the control board 300 is configured to control operation of the ultrasonic transducer 111 arranged at the bottom of the ultrasonic cleaning tank 110.

In this embodiment of the present disclosure, the air barrier layer 210 is subdivided into two functional areas: the first barrier layer 211 and the second barrier layer 212. The first barrier layer 211 is a horizontal air layer formed between the first bottom wall 231 and the second bottom wall 241, the horizontal air layer is arranged directly above the ultrasonic cleaning tank 110, and is mainly configured for blocking noise propagating upward from the ultrasonic cleaning tank 110. The second barrier layer 212 is a vertical air layer formed between the first side wall 232 and the second side wall 242, the vertical air layer is distributed in a ring shape surrounding the side wall of the main body 100, and is mainly configured for blocking noise propagating sideways.

The control board 300 is arranged inside the first barrier layer 211, inside a space between the first bottom wall 231 and the second bottom wall 241. Advantages of this arrangement are: the control board 300 is in a top area of the cover body 200, facilitating electrical connection with the power interface 260 arranged on an outer surface of the cover body 200; the first barrier layer 211 has a certain thickness, providing sufficient installation space for the control board 300, and this space is relatively sealed, able to protect the control board 300 from external moisture and dust.

The power interface 260 is arranged on the outer surface (usually a top portion or a side portion) of the cover body 200, after an external power cord is connected through the power interface 260, power is conducted to the control board 300. The control board 300 integrates power management circuits, control logic circuits, and signal output circuits, and can generate corresponding control signals according to parameters set by a user through an operation interface 270, and transmit the control signals and power to the ultrasonic transducer 111 at the bottom of the ultrasonic cleaning tank 110 through contact of conductive spring pins 310 and conductive contacts 130, thereby controlling parameters including start/stop, working frequency, and power of the ultrasonic transducer 111, achieving precise cleaning control.

Although no electrical components are arranged in the second barrier layer 212, a layout of the second barrier layer 212 surrounding the side wall of the main body 100 forms a ring-shaped acoustic barrier, effectively preventing noise from spreading outward from sides, and forming a three-dimensional noise reduction structure cooperating with the first barrier layer 211 up and down.

By dividing the air barrier layer 210 into the first barrier layer 211 and the second barrier layer 212, and reasonably arranging the control board 300 in the first barrier layer 211, technical effects of maximizing space utilization, comprehensive noise reduction effect, and effective circuit protection are achieved, solving technical problems of a limited arrangement position of the control board 300 and multi-directional propagation of noise.

Figure 6:
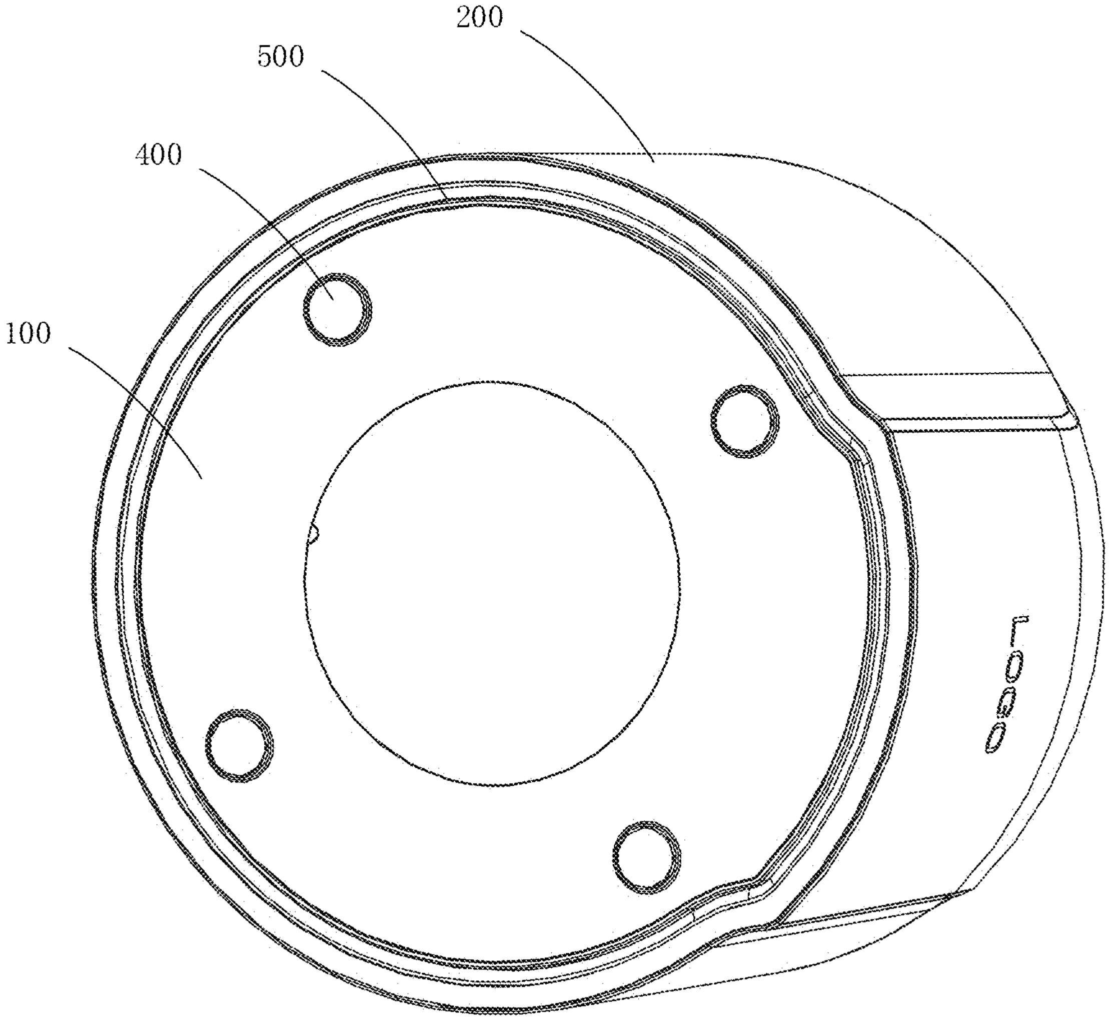
FIG. 6 is a schematic structural diagram of the ultrasonic cleaning machine provided by the present disclosure from another perspective.

Referring to FIG. 5 and FIG. 6, in some embodiments, the control board 300 is provided with at least two conductive spring pins 310 extending downward from the control board 300; and the main body 100 is provided with at least two conductive contacts 130 exposed on an upper surface of the main body 100, when the cover body 200 covers the main body 100, the conductive spring pins 310 contact the conductive contacts 130 to electrically connect to the ultrasonic transducer 111.

In this embodiment of the present disclosure, the conductive spring pins 310 are made of an elastic material, having certain compressibility and resilience. When the cover body 200 covers the main body 100, the conductive spring pins 310 tightly contact the conductive contacts 130 under pressure, forming a stable electrical connection path, ensuring current can be reliably transmitted from the control board 300 to the ultrasonic transducer 111.

This spring pin connection method does not require plugs and sockets, simplifying a connection structure, and avoiding wear and poor contact problems caused by repeated plugging and unplugging of traditional connectors. At the same time, the at least two conductive spring pins 310 and the conductive contacts 130 are respectively used for positive and negative electrode electrical connections, ensuring circuit integrity.

When the user opens the cover body 200, the conductive spring pins 310 automatically disengage from the conductive contacts 130, a circuit is disconnected, thereby achieving a safety function of automatic power-off.

Referring to FIG. 5, in some embodiments, when the cover body 200 is opened and separated from the main body 100, the conductive spring pins 310 disengage from the conductive contacts 130, thereby automatically cutting off power supply to the ultrasonic transducer 111.

In this embodiment of the present disclosure, because contact between the conductive spring pins 310 and the conductive contacts 130 depends on a covered state of the cover body 200, once the cover body 200 is opened, the conductive spring pins 310 retract under elastic action, disengage from the conductive contacts 130, the circuit is automatically disconnected, and the ultrasonic transducer 111 stops working.

This automatic power-off mechanism effectively prevents ultrasonic idling caused by misoperation in an open state of the cover body 200, and avoids damage caused by the ultrasonic transducer 111 working without a liquid medium. The automatic power-off function also improves use safety, preventing the user from contacting live parts when the cover body 200 is opened, reducing electric shock risk.

To further improve vibration reduction and noise reduction performance of a whole machine, in some embodiments, at least one silicone foot pad 400 is arranged on a bottom of the main body 100, for vibration reduction thereby reducing noise generation. When the ultrasonic cleaning machine is working, an internal transducer generates high-frequency vibration. If this vibration is directly transmitted to a work surface on which the ultrasonic cleaning machine is placed, additional noise may be generated due to resonance, and a machine body may become unstable. By arranging the silicone foot pads 400 on the bottom of the main body 100, and using excellent elasticity and damping characteristics of silicone material, these vibrations can be effectively absorbed and buffered, serving as vibration isolation pads, thereby significantly reducing transmission of vibration to an outside, reducing working noise of the whole machine, and also increasing stability of equipment placement, preventing the machine from sliding on a smooth surface.

In one or more embodiments of the present disclosure, a number of the silicone foot pads 400 is set to four. The four silicone foot pads 400 are arranged on the bottom of the main body 100 in a circular array manner. This four-point support layout allows weight of the main body 100 to be evenly distributed to each support point, ensuring the machine has excellent stability on any flat surface, avoiding shaking or tipping due to unstable placement. At the same time, this symmetrical array distribution ensures absorption of vibration from the transducer is balanced in all directions, thereby achieving more ideal and consistent vibration reduction and noise reduction effects.

Referring to FIG. 8, in some embodiments, the main body 100 is provided with a waterproof sealing structure to protect the conductive contacts 130, the waterproof sealing structure includes an upper shell 140 and a lower shell 150 that are connected by ultrasonic welding; and the ultrasonic cleaning tank 110 is embedded in the upper shell 140.

In this embodiment of the present disclosure, the upper shell 140 and the lower shell 150 are tightly connected by ultrasonic welding process, achieving excellent sealing effect, effectively preventing moisture and liquid from penetrating into the main body 100 from outside. The ultrasonic cleaning tank 110 is embedded in the upper shell 140, forming an integrated structure with the upper shell 140, further enhancing waterproof performance.

Although the conductive contacts 130 are exposed on the upper surface of the main body 100 for contact with the conductive spring pins 310, due to sealing protection of the upper shell 140 and the lower shell 150, internal circuits and connection lines are not eroded by moisture. This waterproof sealing structure design not only protects the conductive contacts 130 and internal circuits, but also ensures overall waterproof performance of the main body 100, allowing the cleaning machine to be safely used in humid environments.

Referring to FIG. 8, in some embodiments, a silicone sealing ring 131 is arranged around the conductive contacts 130 on the main body 100 to prevent water from entering internal electrical connections.

In this embodiment of the present disclosure, the silicone sealing ring 131 forms a sealing barrier surrounding the conductive contacts 130. When water droplets or cleaning liquid splash onto the surface of the main body 100, the silicone sealing ring 131 can block liquid from penetrating into gaps around the conductive contacts 130, protecting a connection portion between the conductive contacts 130 and internal circuits from moisture erosion.

The silicone sealing ring 131 also functions as a buffer to some extent, reducing impact force when the conductive spring pins 310 contact the conductive contacts 130, and extending a service life of contact components. By arranging the silicone sealing ring 131 around the conductive contacts 130, local waterproof protection is achieved, solving a technical problem of water penetration along the conductive contacts 130, and obtaining a technical effect of reliable waterproof and comprehensive protection.

Referring to FIG. 9 and FIG. 10, in some embodiments, the ultrasonic cleaning machine further includes an ultraviolet lamp 320 arranged on the control board 300 in the cover body 200, and a protective lens 321 arranged between the ultraviolet lamp 320 and the ultrasonic cleaning tank 110, the ultraviolet lamp 320 is configured to irradiate through the protective lens 321 and disinfect contents in the ultrasonic cleaning tank 110.

In this embodiment of the present disclosure, the ultraviolet lamp 320 can emit ultraviolet rays in a wavelength range of 200 nanometers to 270 nanometers. This wavelength of ultraviolet rays has strong sterilization and disinfection capabilities, capable of destroying DNA structures of microorganisms including bacteria and viruses, causing them to lose reproductive ability, thereby achieving disinfection effect.

The ultraviolet lamp 320 is installed on the control board 300, controlled by the control board 300, and can automatically start a disinfection program after cleaning is completed. The protective lens 321 is made of a material with high ultraviolet transmittance, allowing ultraviolet rays to pass through smoothly and irradiate items in the ultrasonic cleaning tank 110, the protective lens 321 also functions as a physical barrier, preventing moisture and impurities from contacting the ultraviolet lamp 320, thereby extending a service life of the ultraviolet lamp 320.

Referring to FIG. 11, in some embodiments, the ultrasonic cleaning machine further includes a Hall switch 330 arranged on the control board 300, a magnet 160 arranged in the main body 100 at a position corresponding to the Hall switch 330, and a ultraviolet indicator lamp 271 arranged on an operation interface 270 of the cover body 200, when the cover body 200 covers the main body 100, the Hall switch 330 detects a magnetic field from the magnet 160 to enable activation of the ultraviolet lamp 320, and the ultraviolet indicator lamp 271 lights up to indicate an operation state.

In this embodiment of the present disclosure, the Hall switch 330 is a magnetic induction switch based on Hall effect, capable of sensing a magnetic field generated by the magnet 160. When the cover body 200 covers the main body 100, a distance between the Hall switch 330 and the magnet 160 reduces to within a trigger range, after the Hall switch 330 detects the magnetic field signal, the Hall switch 330 sends an enable signal to the control board 300.

After the control board 300 receives this signal, the control board 300 enables activation of the ultraviolet lamp 320. At this time, if the user starts a disinfection function, the ultraviolet lamp 320 can work normally. At the same time, the ultraviolet indicator lamp 271 lights up, intuitively displaying to the user a disinfection function is available or in operation state.

Referring to FIG. 11, in some embodiments, when the cover body 200 is opened and the Hall switch 330 is outside a magnetic field range of the magnet 160, the ultraviolet lamp 320 is automatically deactivated and the ultraviolet indicator lamp 271 turns off, thereby preventing ultraviolet radiation leakage.

In this embodiment of the present disclosure, once the user opens the cover body 200, the distance between the Hall switch 330 and the magnet 160 increases, magnetic field strength rapidly attenuates, the Hall switch 330 does not detect a valid magnetic field signal, and immediately sends a disable signal to the control board 300. After the control board 300 receives the disable signal, the control board 300 forcibly turns off the ultraviolet lamp 320.

Even if the user mistakenly touches a disinfection button, the ultraviolet lamp 320 cannot start, ensuring ultraviolet rays do not leak into an external environment when the cover body 200 is open. At the same time, the ultraviolet indicator lamp 271 turns off, clearly indicating to the user the disinfection function is turned off.

This automatic deactivation mechanism provides reliable safety protection for the user, avoiding harm of ultraviolet rays to human skin and eyes, especially for children and users who do not understand hazards of ultraviolet rays, this function is particularly important. Through this automatic safety control based on a covered state, effective protection against ultraviolet leakage is achieved, solving safety hazard problems during use, and obtaining a technical effect of high safety and reliable protection.

Referring to FIG. 1 and FIG. 12, in some embodiments, the operation interface 270 is arranged on a top surface of the cover body 200, and includes at least one mode selection button 272 for controlling a cleaning mode and a duration.

In this embodiment of the present disclosure, the operation interface 270 serves as a main entry for user interaction with the cleaning machine, arranged on the top surface of the cover body 200, a most easily operable position, allowing the user to operate conveniently without bending or adjusting an angle.

The mode selection button 272 can be a mechanical button, a touch button, or a touch screen. By pressing or touching the mode selection button 272, the user can switch between different cleaning modes, such as a standard cleaning mode, a powerful cleaning mode, a gentle cleaning mode, each mode corresponding to different ultrasonic power and working duration, meeting cleaning needs of different items.

After the control board 300 receives a mode selection signal, the control board 300 adjusts working parameters of the ultrasonic transducer 111 according to a preset program, achieving precise control. The operation interface 270 may also include a display screen for displaying information including a currently selected mode and remaining time, improving user experience.

By arranging the operation interface 270 and the mode selection button 272 on the top surface of the cover body 200, a convenient and intuitive operation method is achieved, solving technical problems of inconvenient operation and single function, and obtaining a technical effect of simple operation and rich functions.

Referring to FIG. 13, in some embodiments, the ultrasonic cleaning machine includes: an ultrasonic transducer 111, the ultrasonic transducer 111 is arranged at a bottom of the ultrasonic cleaning tank 110, the ultrasonic cleaning tank 110 is connected to the ultrasonic transducer 111; a connection board 141, the connection board 141 is arranged at an upper end of the upper shell 140, the connection board 141 is provided with at least two conductive posts 141*a*, the two conductive posts 141*a* are respectively electrically connected to two electrodes of the ultrasonic transducer 111, contacts of the at least two conductive posts 141*a* are exposed from an upper surface of the upper shell 140, when the cover body 200 covers the main body 100, the conductive spring pins 310 tightly contact the contacts of the conductive posts 141*a* to establish electrical conduction with the ultrasonic transducer 111 thereby working.

In this embodiment of the present disclosure, the ultrasonic transducer 111 is a core component converting electrical energy into mechanical vibration energy, installed at the bottom of the ultrasonic cleaning tank 110. When the ultrasonic transducer 111 works, the ultrasonic transducer 111 generates high-frequency vibration transmitted through a wall of the cleaning tank to cleaning liquid, forming cavitation effect to achieve cleaning.

The connection board 141 serves as a transfer platform for electrical connection, fixed at the upper end of the upper shell 140. The conductive posts 141*a* on the connection board 141 pass through the upper shell 140, a first end of the conductive posts 141*a* is respectively connected to the two electrodes of the ultrasonic transducer 111, and contacts at a second end of the conductive posts 141*a* are exposed from the upper surface of the upper shell 140, forming the conductive contacts 130. This structural design allows current to flow from the control board 300 through the conductive spring pins 310 and the conductive posts 141*a* to finally reach the ultrasonic transducer 111, forming a complete power supply circuit.

A design of the conductive posts 141*a* ensures stability and reliability of current transmission, avoiding technical problems of line aging and poor contact. When the cover body 200 covers the main body 100, the conductive spring pins 310 automatically press tightly against the contacts of the conductive posts 141*a*, achieving fast and reliable electrical connection without additional plugging and unplugging operations.

Through this design of the connection board 141 and the conductive posts 141*a*, convenient connection between internal circuits of the main body 100 and a control system of the cover body 200 is achieved, solving technical problems of complex electrical connection and poor reliability, and obtaining a technical effect of reliable connection and simple structure.

Referring to FIG. 14, in some embodiments, the ultrasonic transducer 111 includes a ceramic ultrasonic transducer 111*a* including two electrodes, and the at least two conductive posts 141*a* are respectively connected to the two electrodes of the ceramic ultrasonic transducer 111*a*.

In this embodiment of the present disclosure, the ceramic ultrasonic transducer 111*a* is made of piezoelectric ceramic material, having advantages of high energy conversion efficiency, good stability, and long service life. Compared to traditional metal transducers, conversion efficiency of the ceramic ultrasonic transducer 111*a* can be improved by more than 20%, and the ceramic ultrasonic transducer 111*a* can generate stronger ultrasonic vibration at lower electrical power, thereby improving cleaning effect and reducing energy consumption.

The ceramic ultrasonic transducer 111*a* has a positive electrode and a negative electrode, the conductive posts 141*a* are respectively connected to the two electrodes by welding or crimping, ensuring good electrical contact and current transmission. Due to excellent characteristics of ceramic material, the ceramic ultrasonic transducer 111*a* can work continuously for a long time without easily heating or damaging, ensuring reliability and durability of the cleaning machine.

The technical solution of the present disclosure, by arranging the control board inside the air barrier layer of the cover body, achieves complete separation of a control circuit system from a cleaning cavity, the main body does not contain any circuit system. Even if liquid overflows during cleaning or the main body enters water, a circuit short circuit will not be caused, effectively avoiding electric shock risk, and use is safe and reliable. The cover body and the main body can be completely separated, the main body adopts a fully waterproof sealing structure, and after use, the main body 100 can be directly rinsed and cleaned with water, operation is simple and convenient. The air barrier layer 210 also has physical sound insulation function, effectively reducing working noise.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

The invention claimed is:

1. An ultrasonic cleaning machine, comprising:

a main body, an ultrasonic cleaning tank being arranged inside the main body;

a cover body, the cover body covering the main body, and an air barrier layer being arranged inside the cover body, the air barrier layer being configured for absorbing noise generated by the ultrasonic cleaning tank in an operating state; and a control board, the ultrasonic cleaning tank being provided with an ultrasonic transducer, the control board being electrically connected to the ultrasonic transducer; the control board being arranged inside the air barrier layer;

wherein the cover body comprises an outer shell, and an inner shell spaced apart from the outer shell; the outer shell is connected to the inner shell; the air barrier layer is formed between the outer shell and the inner shell.

2. The ultrasonic cleaning machine according to claim 1, wherein the outer shell comprises a first bottom wall, a first side wall being provided on one side of the first bottom wall, the first bottom wall and the first side wall forming a first receiving cavity;

the inner shell comprises a second bottom wall, a second side wall being provided on one side of the second bottom wall, a sealing structure being provided at an end of the second side wall, the second bottom wall and the second side wall forming a second receiving cavity;

the second bottom wall and the second side wall are both arranged inside the first receiving cavity, and are respectively spaced apart from the first bottom wall and the first side wall, and the sealing structure is connected to an end of the first side wall to form a sealed air barrier layer.

3. The ultrasonic cleaning machine according to claim 2, wherein the sealing structure comprises a blocking edge arranged at the end of the second side wall and an engaging portion arranged on the blocking edge, an engaging groove is provided at the end of the first side wall, and the engaging portion engages with the engaging groove.

4. The ultrasonic cleaning machine according to claim 3, wherein the main body forms a protruding guide structure on a side surface of the main body; and the cover body is provided with a corresponding guide groove, the guide groove being configured to engage with the protruding guide structure to provide positioning and guidance during opening and closing of the cover body.

5. The ultrasonic cleaning machine according to claim 2, wherein the air barrier layer comprises a first barrier layer formed between the first bottom wall and the second bottom wall, and a second barrier layer formed between the first side wall and the second side wall;

the first barrier layer is arranged above the ultrasonic cleaning tank, the control board is arranged inside the first barrier layer; the second barrier layer is arranged surrounding a side wall of the main body;

a power interface is arranged on the cover body and electrically connected to the control board; and the control board is configured to control operation of the ultrasonic transducer arranged at a bottom of the ultrasonic cleaning tank.

6. The ultrasonic cleaning machine according to claim 5, wherein the control board is provided with at least two conductive spring pins extending downward from the control board; and the main body is provided with at least two conductive contacts exposed on an upper surface of the main body;

when the cover body covers on the main body, the conductive spring pins contact the conductive contacts to electrically connect to the ultrasonic transducer.

7. The ultrasonic cleaning machine according to claim 6, wherein when the cover body is opened and separated from the main body, the conductive spring pins disengage from the conductive contacts, thereby automatically cutting off power supply to the ultrasonic transducer.

8. The ultrasonic cleaning machine according to claim 6, wherein the main body is provided with a waterproof sealing structure to protect the conductive contacts, the waterproof sealing structure comprises an upper shell and a lower shell that are connected by ultrasonic welding; and the ultrasonic cleaning tank is embedded in the upper shell.

9. The ultrasonic cleaning machine according to claim 8, wherein a silicone sealing ring is arranged around the conductive contacts on the main body to prevent water from entering internal electrical connections.

10. The ultrasonic cleaning machine according to claim 8, wherein a sound absorbing cotton is arranged on a side of the lower shell opposite to the ultrasonic cleaning tank.

11. The ultrasonic cleaning machine according to claim 8, comprising:

an ultrasonic transducer, the ultrasonic transducer being arranged at a bottom of the ultrasonic cleaning tank, and the ultrasonic cleaning tank being connected to the ultrasonic transducer;

a connection board, the connection board being arranged at an upper end of the upper shell, the connection board being provided with at least two conductive posts, the two conductive posts being respectively electrically connected to two electrodes of the ultrasonic transducer;

contacts of the at least two conductive posts being exposed from an upper surface of the upper shell;

wherein when the cover body covers the main body, conductive spring pins tightly contact the contacts of the conductive posts to establish electrical conduction with the ultrasonic transducer thereby working.

12. The ultrasonic cleaning machine according to claim 11, wherein the ultrasonic transducer comprises a ceramic ultrasonic transducer comprising two electrodes, and the at least two conductive posts are respectively connected to the two electrodes of the ceramic ultrasonic transducer.

13. The ultrasonic cleaning machine according to claim 1, wherein at least one silicone foot pad is arranged on a bottom of the main body, for vibration reduction thereby reducing noise generation.

14. The ultrasonic cleaning machine according to claim 1, wherein a shock absorption rubber ring is arranged on an end surface of the blocking wall.

15. The ultrasonic cleaning machine according to claim 1, further comprising:

an ultraviolet lamp arranged on the control board in the cover body; and a protective lens arranged between the ultraviolet lamp and the ultrasonic cleaning tank;

wherein the ultraviolet lamp is configured to irradiate through the protective lens and disinfect contents in the ultrasonic cleaning tank.

16. The ultrasonic cleaning machine according to claim 15, further comprising:

a Hall switch arranged on the control board;

a magnet arranged inside the main body at a position corresponding to the Hall switch; and an ultraviolet indicator lamp arranged on an operation interface of the cover body;

wherein when the cover body covers the main body, the Hall switch detects a magnetic field from the magnet to enable activation of the ultraviolet lamp, and the ultraviolet indicator lamp lights up to indicate an operation state.

17. The ultrasonic cleaning machine according to claim 16, wherein when the cover body is opened and the Hall switch is outside a magnetic field range of the magnet, the ultraviolet lamp is automatically deactivated and the ultraviolet indicator lamp turns off, thereby preventing ultraviolet radiation leakage.

* * * * *